US006654366B1

(12) United States Patent
Ketcham

(10) Patent No.: US 6,654,366 B1
(45) Date of Patent: Nov. 25, 2003

(54) USE OF VIRTUAL GATEWAY IN H.323 SYSTEM

(75) Inventor: Carl Ketcham, Taylorsville, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/257,326

(22) Filed: Feb. 25, 1999

(65) Prior Publication Data (65)

(51) Int. Cl.$^7$ ................................................ H04L 12/66
(52) U.S. Cl. ...................... 370/352; 370/401; 370/410; 370/475
(58) Field of Search ................................ 370/352, 353, 370/354, 355, 356, 357, 389, 400, 401, 409, 410, 465, 475

(56) References Cited

U.S. PATENT DOCUMENTS

| | | | | |
|---|---|---|---|---|
| 6,018,360 A | * | 1/2000 | Stewart et al. ................. | 348/15 |
| 6,081,513 A | * | 6/2000 | Roy ............................. | 370/260 |
| 6,185,288 B1 | * | 2/2001 | Wong .......................... | 379/219 |
| 6,259,691 B1 | * | 7/2001 | Naudus ....................... | 370/352 |
| 6,298,062 B1 | * | 10/2001 | Gardell et al. ............... | 370/401 |
| 6,449,260 B1 | * | 9/2002 | Sassin et al. ................ | 370/270 |

* cited by examiner

*Primary Examiner*—Ricky Ngo
*Assistant Examiner*—Phuc Tran
(74) *Attorney, Agent, or Firm*—McDonnell Boehnen Hulbert & Berghoff

(57) ABSTRACT

A method for improving the scalability of H.323 systems is described. The method allows a H.323 port to be made busy. This prevents other incoming, or outgoing, calls from using the port. In one embodiment, a virtual port address is provided in response to an address query request. Only later, if the call setup request is made, is an H.323 port made busy. Then, the address of the busy H.323 port is substituted for the virtual port address in the acknowledgement of the call setup request. In some embodiments, the H.323 port is made busy at the time of the address query request. In some embodiments, computer programs implement the virtual gateway functionality and make H.323 ports busy. Thus in both embodiments, the port provided by the H.323 gatekeeper will be available for use by the requesting H.323 device when the call setup request is made. In some embodiments, the H.323 gatekeeper does not need to directly monitor the status of H.323 ports and can poll a smaller number of virtual gateways.

16 Claims, 3 Drawing Sheets

USE OF VIRTUAL GATEWAY IN H.323 SYSTEM

BACKGROUND OF THE INVENTION

1. Field of the Invention

This invention relates to the field of H.323 multimedia conferencing. In particular, the invention relates to improvements for scaling H.323 systems.

2. Description of the Related Art

The International Telecommunications Union (ITU) has promulgated a number of different standards for telecommunications. The telecommunications standardization sector is referred to as the ITU-T. One of the standards developed by the ITU-T is the H.323 standard for video, or multimedia, conferencing. The H.323 standard uses other ITU-T standards for encoding and decoding the audio, video, data, and control information.

There are three primary types of devices in the H.323 standard: H.323 terminals, H.323 gateways, and H.323 gatekeepers. The terminals are multimedia terminals such as personal computers coupled to a local area network (LAN). The H.323 gateways allow the interconnection of other systems with an H.323 network. For example an H.323 gateway could interconnect plain old telephone service (POTS) with an H.323 network. The gateways can also allow separate networks of H.323 devices to be bridged. The H.323 gatekeeper provides authentication, address query resolution, and other services for devices. Additionally, the H.323 standard supports an additional type of device, a H.323 multipoint control units (MCUs). A H.323 MCU supports conference calls and other features.

One application of the H.323 standard is to replace circuit switched services with packet switched services. Plain old telephone service (POTS) is an example of a circuit switched network. Each POTS call requires a dedicated circuit from end to end throughout the public switched telephone network (PSTN). By placing H.323 gateways and gatekeepers in telephone central office switching systems it is possible to carry a call over a packet switched network from central office to central office.

Consider the following example, both the central office serving a POTS line in San Francisco and the central office serving the call destination in Washington, D.C., have H.323 equipment. It is possible for the call to be completed as follows. The caller picks up her/his telephone in San Francisco. In the central office in San Francisco, the call comes into a central office switch. An H.323 gateway in the central office can receive the time division multiplexed (TDM) signal from the central office switch in any of a number of standard formats, such as, a T1 line. The H.323 gateways convert the voice channels in the T1 line into the H.323 audio standard format, G.711. The TDM signals have now been packetized for transmission across a packet switched network.

Each H.323 gateway has a limited number of H.323 ports, or ports. The number of ports corresponds to the number of simultaneous calls a particular H.323 gateway can handle. For example, if an H.323 gateway is coupled to the central office switch by a T1 line, then only twenty-four voice channels can go through the gateway at a time.

The other component of carrying circuit switched calls over a packet switched network using H.323 is the address lookup and channel setup process. Each H.323 gateway is managed by at least one H.323 gatekeeper. A single H.323 gatekeeper may manage multiple H.323 gateways. The H.323 gatekeeper provides a variety of services to the H.323 gateways it manages aside from answering address query requests. The H.323 gatekeeper services include registration, authentication, status, and billing. The local H.323 gatekeeper sends an address query to the remote H.323 gatekeeper. In the example, the San Francisco gatekeeper would ask the Washington gatekeeper for a port address. The Washington gatekeeper responds with a port address. For example, if the Washington gatekeeper manages a single H.323 gateway with sixteen ports, then the port address will correspond to one of the sixteen ports on that H.323 gateway.

A port address is the Internet protocol (IP) address of an H.323 gateway together with the IP port address one of the H.323 ports on that gateway. The port address can be written in a standard format for specifying an IP address and a port such as: 192.168.168.100:2000, which stands for IP address 192.168.168.100 at port 2000.

The response from the Washington gatekeeper would travel back to the San Francisco gatekeeper and then to the gateway handling the call. At this point, the gateway in San Francisco would send a call setup request to the port address in Washington. If the port on the Washington gateway is still available, it will acknowledge the request. It is possible that an outgoing call from the Washington central office could start to use the port before the call setup request was received. In that case, the call setup would fail and a new port would have to be requested.

Assuming the port is still free and acknowledges the call setup, a logical channel zero (LCO) is opened between the San Francisco gateway port and the Washington gateway port. Next, capabilities negotiation takes place. Once the capabilities have been determined, two additional logical channels are opened. The first channel, LCAB, is for voice packets from A to B. The second channel, LCBA, is for voice packets from B to A. In this example, LCAB would be for packets from San Francisco to Washington and LCBA would be for packets from Washington to San Francisco. The phone in Washington is then rung. Once the phone in Washington is lifted off the hook, the two parties can communicate as they normally do. When the handsets of the phones are replaced on the hooks, the H.323 channel and call teardown process ensues.

A single central office switching system might include several racks of H.323 equipment. Each rack might include on the order of a thousand ports. With multiple racks in a single central office, a single gatekeeper might need to manage several thousand ports. It may be difficult for the H.323 gatekeeper to accurately and quickly monitor port status given this number of ports.

Additionally, between the time that the remote gatekeeper provides a port address, and the time that the call setup request is made, the port can become busy. In the example, the Washington gatekeeper provided a port address of 192.168.168.100:2000. It is possible for a phone in Washington to be lifted off the hook and get allocated to that same port prior to the call setup request from San Francisco. Then, when the San Francisco gateway sends the call setup request, the port will already be in use by the outgoing call.

If the prior art techniques are used, it is not possible to guarantee that a port provided in response to an address query request will still be available by the time call setup takes place. Therefore, it is desirable to have a method that will ensure that a port is still available when the call setup request is made. If the prior art techniques are used, the gatekeeper may have a large number of ports to monitor usage on. Therefore, it is desirable to have a method that will allow the port status information to be managed separate from the gatekeeper functions to provide better scalability.

SUMMARY OF THE INVENTION

An H.323 system can be improved according to some embodiments of the invention. The improvements allow H.323 systems to scale to include more ports and adds the ability to busy, or reserve, ports. In one embodiment, the port is busied after the address query request to the gatekeeper. Once busied, the port can not be used by a different call, incoming or outgoing, until it is released or times out.

In some embodiments, the port is busied before responding to the address query request. In this embodiment, the response to the address query request includes the port address of a busy port.

In some embodiments, a virtual port address is given in response to an address query request. This allows the system to delay making a port busy until a call setup request is received on the virtual port. In this embodiment, the response to the address query includes the address of the virtual port. The virtual port does not have to correspond directly to any particular H.323 port in the system. When a call setup request is received at the virtual port, one of the H.323 ports busied. In the acknowledgement of the call setup, a substitution of the address of the busy port is made for the virtual port address. This substitution causes further H.323 communications to be directed to the busy port rather than the virtual port.

Some embodiments include computer programs that provide a virtual gateway. The virtual gateway programs can reserve ports and supports the substitution of the port addresses in call setup acknowledgements. The virtual gateway programs can also monitor the status of a number H.323 ports. This allows a single gatekeeper to handle a larger number of ports, such as in a telephone central office.

Some embodiments include storing port status information on the virtual gateway. This relieves the gatekeeper of the need to poll gateways for port status information.

DETAILED DESCRIPTION

A. System Overview

Figure 1:
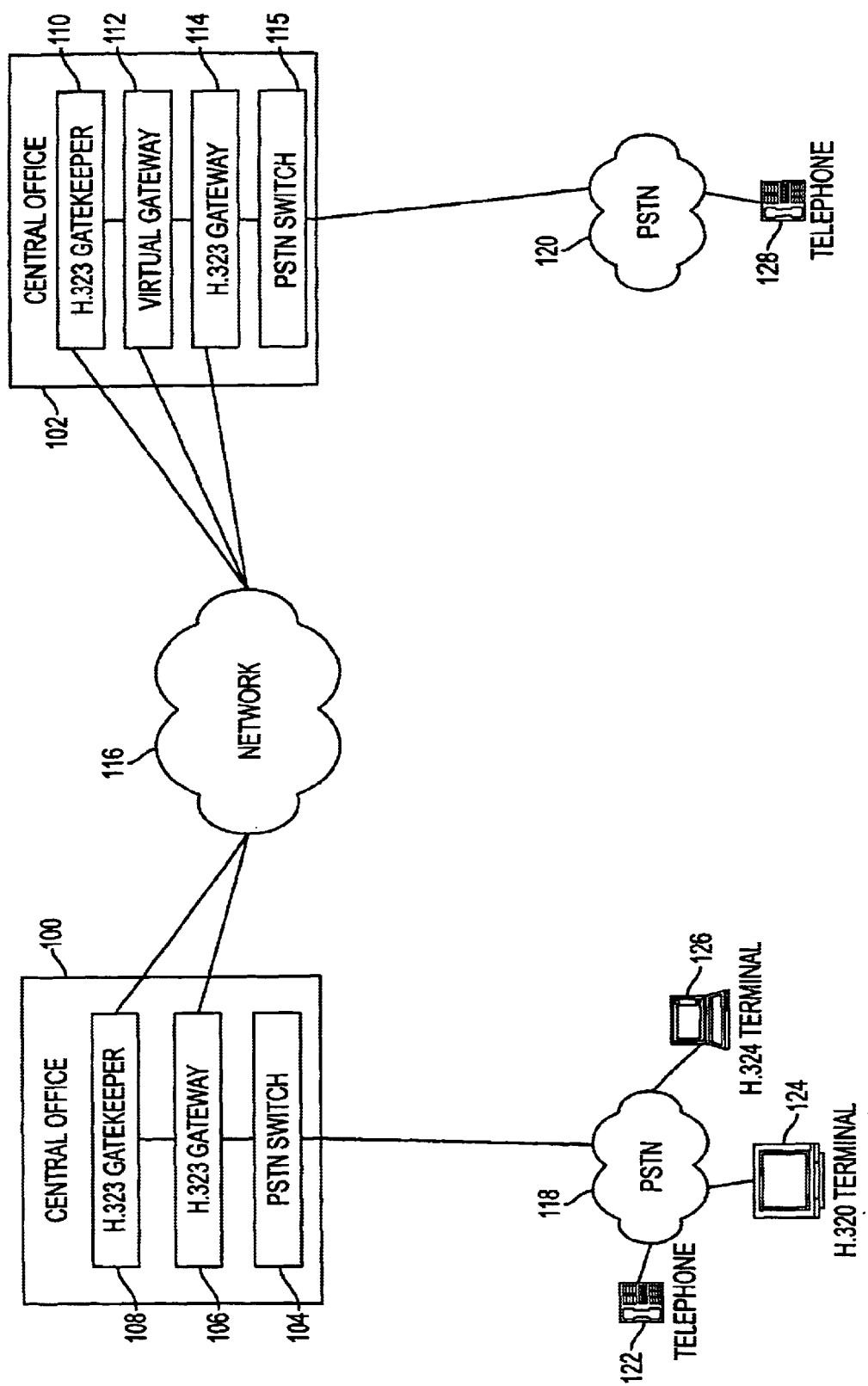
FIG. 1 is a block diagram of a network including one embodiment of the invention.

FIG. 1 is a block diagram of network including one embodiment of the invention. FIG. 1 shows how one embodiment of the invention can be deployed in a central office H.323 system. This system helps ensure that when the gatekeeper in the remote office provides a port address to the gatekeeper in the originating office, the port will be available when the call setup request is made.

The following paragraph lists the elements of FIG. 1. FIG. 1 includes two central offices 100–102, a network 116, a public switched telephone network (PSTN) 118–120, a telephone 122, a H.320 terminal 124, a H.324 terminal 126, and a telephone 128. The central office 100 includes a PSTN switch 104, a H.323 gateway 106, and a H.323 gatekeeper 108. The central office 102 includes a H.323 gatekeeper 110, a virtual gateway 112, a H.323 gateway 114, and a PSTN switch 115.

The following paragraph describes the interconnections between the elements of FIG. 1. The telephone 122, the H.320 terminal 124, and the H.324 terminal 126 are coupled to the PSTN 118. The PSTN 118 is coupled in communication with the PSTN switch 104 in the central office 100. The PSTN switch 104 is coupled in communication with the H.323 gateway 106. The H.323 gateway is coupled in communication with the H.323 gatekeeper 108 and the network 116. The H.323 gatekeeper 108 is coupled in communication with the network 116. The telephone 128 is coupled in communication with the PSTN 120. The PSTN 120 is coupled in communication with the PSTN switch 115. The PSTN switch 115 is coupled in communication with the H.323 gateway 114. The H.323 gateway 114 is coupled in communication with the virtual gateway 112, the H.323 gatekeeper, and the network 116. The virtual gateway 112 is coupled in communication with the network 116 and the H.323 gatekeeper 110. The H.323 gatekeeper 110 is coupled in communication with the network 116.

The following describes the use of the elements of FIG. 1. The telephone 122 is a standard telephone. It is coupled to wiring that links it to the PSTN 118. The PSTN 118 can include the neighborhood wiring between the telephone 122 and the central office 100. The telephone 122 could also be a digital telephone such as the ones used in many office telephone systems. In the case of an office phone system, the PSTN 118 would include the wiring between the telephone 122 and the corporate telecommunications switching system. The PSTN 118 is also coupled to video conferencing systems such as the H.320 terminal 124. The H.320 terminal 124 operates over standard phone wires using the ISDN protocol. The H.324 terminal 126 is a terminal that provides video conferencing using the PSTN 118.

The central office 100 supports using H.323 to transfer circuit switched calls onto a packet switched network, but does not include a virtual gateway in this example. The central office 100 could also be a private branch exchange, or some other type of telecommunications center. Inside the central office 100, the PSTN switch 104 can transfer lines to the H.323 gateway 106. The PSTN switch 104 could be a Nortel DMS 250, an ATT 5ESS, a private branch exchange system, or some other type of switch. The PSTN switch 104 and the H.323 gateway 106 can be coupled by a T1 line, a T3 line, an E1 line, an E3 line, or some other type of communications line.

The H.323 gateway 106 could be comprised of multiple H.323 gateways. Each H.323 gateway can support a limited number of a ports depending on its connection to the PSTN switch 104. The number of ports may also be limited by the number of codecs, or encoders and decoders, the H.323 gateway has to convert voice communications to and from the H.323 standard.

The H.323 gatekeeper 108 could be comprised of multiple systems including billing and accounting systems for tracking usage. The H.323 gatekeeper 108 answers address query requests from remote gatekeepers and responds with a port address corresponding to a port on the H.323 gateway 106.

The network 116 could include the Internet, a virtual private network, a private data network, and/or some other type of packet switched network. In this example, the network 116 is a packet switched network used by telecommunications carriers.

The central office 102 is similar to the central office 100; however, the central office 102 includes a virtual gateway 112. In this example, the virtual gateway 112 is separate from the H.323 gatekeeper 110. In some embodiments, the functionality of the virtual gateway 112 is incorporated into the H.323 gatekeeper 110. In some embodiments, the functionality of the virtual gateway 112 is incorporated into the H.323 gateway 114.

The H.323 system in the central office 102 can reserve a port on the H.323 gateway 114 by making the port busy. This prevents the problem of the prior art where a port could become busy between the time of a response to an address query request and the time of the call setup request. This also allows the H.323 system to scale better for large installations. Two methods that can solve these problems include delayed actual port binding and early actual port binding. The first method requires no modifications to the H.323 gatekeeper and is described first.

Delayed Actual Port Binding

In some embodiments of the invention, the virtual gateway 112 allows for delayed binding of the call to an actual port. This method can also be referred to as the port substitution method because during the process of connecting the call, the port being used is substituted late in the process.

This method has the H.323 gatekeeper 110 respond with an address of a port on the virtual gateway 112. In this embodiment, the H.323 gatekeeper 110 can include a standard H.323 gatekeeper. The list of H.323 gateways and ports managed by the H.323 gatekeeper 110 is modified to list the virtual gateway 112. For example, if the configuration data for the H.323 gatekeeper 110 previously listed the H.323 gateway 114 and the ports for the H.323 gateway 114, that configuration information is removed. The new configuration information lists the virtual gateway 112 and a range of port addresses on the virtual gateway 112. In this example, the H.323 gatekeeper 110 responds with a port address on the virtual gateway 112.

Only when the actual call setup request is made does the virtual gateway 112 then select and make a port busy on the H.323 gateway 114. In this example, that would be when the H.323 gateway 106 that is initiating the call sends a call setup request to the virtual gateway.

The virtual gateway 112 then sends a message to the H.323 gateway 114 to busy a port. When a port is made busy no other call can use the port for incoming or outgoing purposes until the port is released or times out. The ports are released automatically when the call is completed. Also, the busy request can automatically be set to time out after a predetermined period. This prevents a port from staying busy if a communications session does not begin within the predetermined period. The virtual gateway 112 can manage the time out period or the H.323 gateway 114 can support the time out. The virtual gateway 112 can also release ports from the busy state with a message as well. The message can be a proprietary format or it can be an extension of the H.323 protocol.

Once the virtual gateway 112 receives an acknowledgement from the H.323 gateway 114 that the requested port is busy, the virtual gateway 112 sends back a response to the H.323 gateway 106. The response will include a port address at the H.323 gateway 114 to use for logical channel 0 (LC0).

Early Actual Port Binding

In some embodiments of the invention, the call is bound to a particular port early in the process. In this embodiment, the standard behavior of an H.323 gatekeeper is extended. This can be done by having the H.323 gatekeeper 110 request a port from the virtual gateway 112 before responding to the address query request. In this embodiment, the port is made busy before the call setup request is made.

In this example, the H.323 gatekeeper 110 would make a port on the H.323 gateway 114 busy using the virtual gateway 112 before responding to the address query request from the H.323 gatekeeper 108.

The virtual gateway 112 sends a message to the H.323 gateway 114 to busy a port. The message can be a proprietary format or it can be an extension of the H.323 protocol. Once the virtual gateway 112 receives an acknowledgement from the H.323 gateway 114 that the requested port is busy, the virtual gateway 112 sends back a response to the H.323 gatekeeper 110 with the port address. The port address is then included in the response to the address query request.

In both embodiments, the problem of ports becoming busy before the originating end is able to complete the H.323 call setup process is avoided.

Management Interface

Both of the delayed and early actual port binding techniques require some additional port management compared to the H.323 standard. The port status for all of the available H.323 ports must be maintained. Also, it must be possible to make a port busy and release it either after a call or if a predetermined period expires without the port being used. The H.323 protocol can be extended to support these additional features or proprietary messaging formats can be used.

To track the status of the H.323 ports, regular polling can be done by the virtual gateway 112. This involves periodically sending a query to every port requesting the port status. This can be used to help detect faulty or malfunctioning ports as well as to ensure the status information remains current. Additionally, the port status can be monitored by keeping track of when the ports are put into use and when they are released. All of the port status information can be stored by the virtual gateway 112. In some embodiments, the H.323 gatekeeper 110 is relieved of monitoring port status information for the H.323 ports on the H323 gateway 114.

B. Delayed Actual Port Binding

Figure 2:
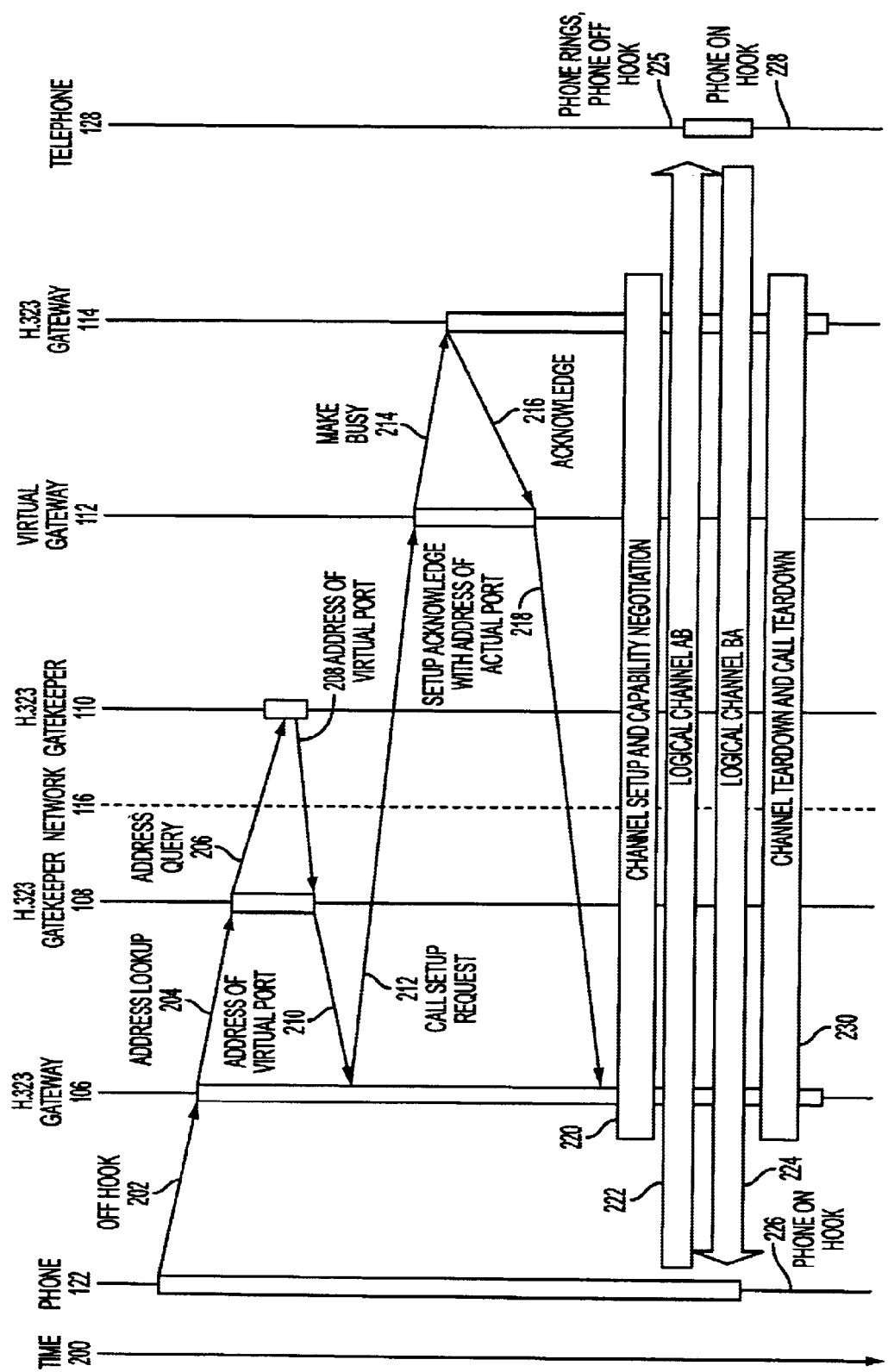
FIG. 2 is a process flow diagram of the call setup process according to one embodiment of the invention.

FIG. 2 is a process flow diagram of the call setup process according to one embodiment of the invention. The process described in FIG. 2 is based on the configuration of FIG. 1. This shows how the delayed actual port binding process works.

FIG. 2 is drawn using principles from the Unified Modeling Language. The flow of time is from earliest, top of figure, to latest, bottom of figure, as indicated by the arrow 200. Each of the participants in the call setup process is shown as a narrow line with a thicker box indicating periods during which the participant is active in the process. Messages between participants are shown as directed lines from one participant to another.

From left to right, the participants are the telephone 122, the H.323 gateway 106, the H.323 gatekeeper 108, the H.323 gatekeeper 110, the virtual gateway 112, the H.323 gateway 114, and the phone 128. The network 116 is indicated as a dotted line between he H.323 gatekeeper 108 and the H.323 gatekeeper 110.

The process will now be described in chronological order. First, at time 202, the telephone 122 is lifted off the hook. The dialing information is then conveyed to the H.323 gateway 106. Next, at time 204, The H.323 gateway 106 requests an address lookup from the H.323 gatekeeper 108. Next, at time 206, the H.323 gatekeeper 108 sends an address query request to the H.323 gatekeeper 110. Then at time 208, rather than provide the actual port address to be used for communication, the H.323 gatekeeper 108 responds with the address of the virtual port. Next, at time 210, the H.323 gatekeeper 108 relays the virtual port address to the H.323 gateway 106 completing the address lookup.

At time 212, a call setup request is made by the H.323 gateway 106 to the virtual gateway 112. Next, at time 214, the virtual gateway 112 selects a port and makes it busy on the H.323 gateway 114. Then at time 216, the make busy request is acknowledged. If no response is received within a predetermined period, the virtual gateway 112 can select another port and try again to make that port busy. The messages that allow the virtual gateway to make ports busy on the H.323 gateway 114 can be proprietary messages or H.323 messages.

At time 218, the virtual gateway 112 acknowledges the call setup request and provides the address of the actual port. By acknowledging the call setup request with a new port address, the remainder of the communication will occur directly between the two gatekeepers. This can be accomplished by using a standard H.323 message or by extending the H.323 messages to allow the port address to be changed.

Next, channel setup and capability negotiation process 220 will occur between the two gateways 106 and 114. This will result in two logical channels for voice communications: LCAB 222 and LCBA 224. The channel LCAB 222 is the logical channel for communications from the telephone 112 to the telephone 128. The channel LCBA 224 is the logical channel for communications from the telephone 128 to the telephone 112.

At time 225, the telephone 128 will ring. Once lifted off the hook, the two participants, computers, modems, etc., can communicate over the voice channels. When one or both of the participants places their telephone back on the hook, at time 226–228, the channel and call teardown process 230 begins. When the process is complete, the port on the H.323 gateway is released and can be used for new incoming or outgoing calls.

In some embodiments, the virtual gateway 112 can make a port busy in anticipation of a call setup request. In one embodiment, a message from the H.323 gatekeeper 110 to the virtual gateway 112 causes a port to be reserved prior to the virtual gateway 112 receiving the call setup request. In some embodiments, statistical methods can be used to anticipate call setup requests and make ports busy prior to receiving actual requests. The statistical methods could be based on usage statistics, the time of day, and/or other factors. These methods decrease the amount of time it takes for the virtual gateway 112 to respond to call setup requests with a busy port and allow the virtual gateway to assign a busy port to an incoming call after the port has been made busy.

C. Early Actual Port Binding

Figure 3:
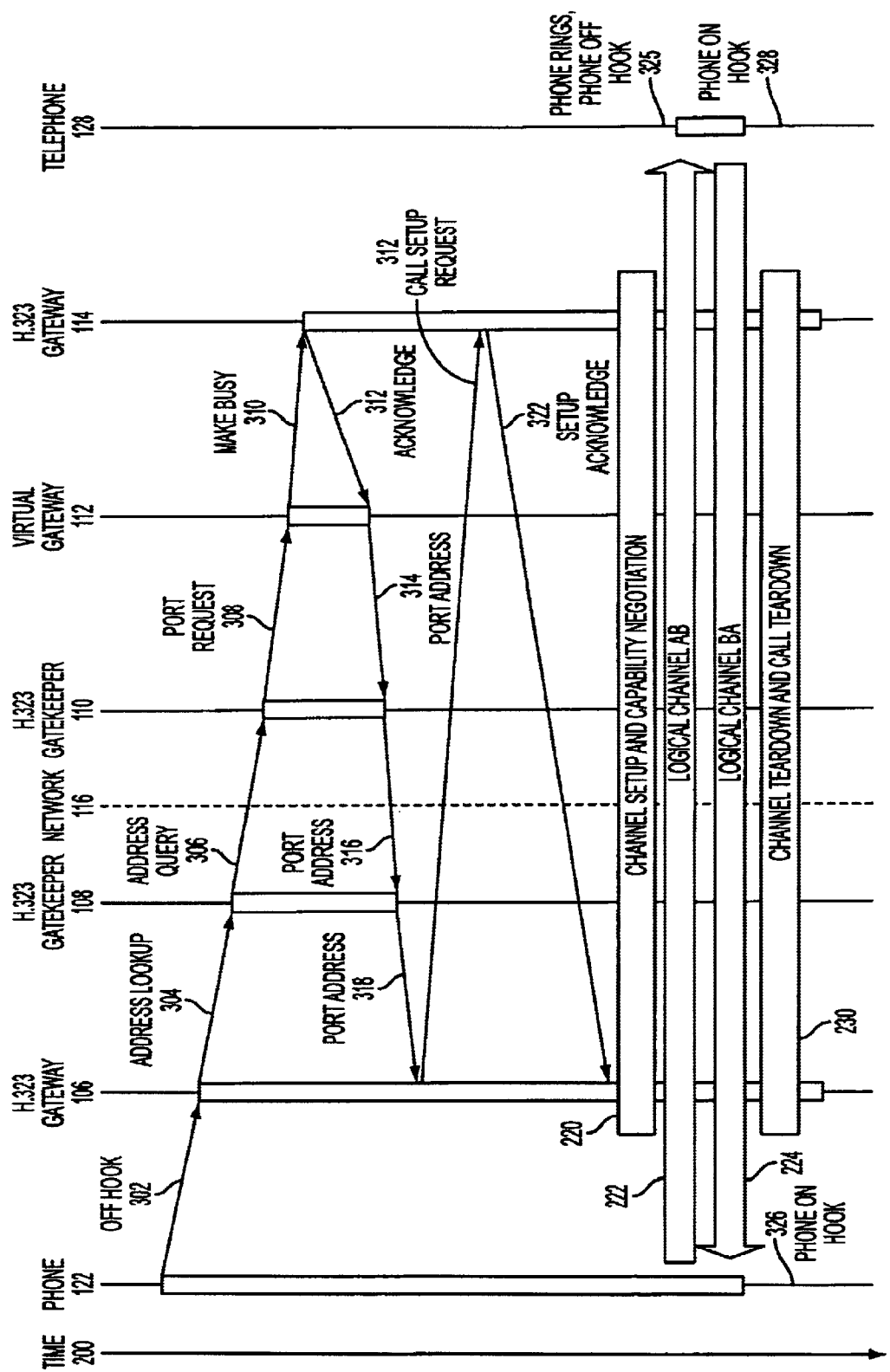
FIG. 3 is a process flow diagram of the call setup process according to one embodiment of the invention.

FIG. 3 is a process flow diagram of the call setup process according to one embodiment of the invention. The process described in FIG. 3 is based on the configuration of FIG. 1. This shows how the early actual port binding process works.

FIG. 3, like FIG. 2, is a modified Unified Modeling Language diagram and follows the same conventions described for FIG. 2. The participants in FIG. 3 are the same as FIG. 2, but their behavior is different.

The process will now be described in chronological order. First, at time 302, the telephone 112 is lifted off the hook. The dialing information is then conveyed to the H.323 gateway 106. Next, at time 304, The H.323 gateway 106 requests an address lookup from the H.323 gatekeeper 108.

Next, at time 306, the H.323 gatekeeper 108 sends an address query request to the H.323 gatekeeper 110. Rather than immediately respond with a port address or a virtual port address, the H.323 gatekeeper 110 will reserve an actual port.

To make an actual port busy, at time 308, the H.323 gatekeeper 110 sends a port request to the virtual gateway 112. This could be a proprietary message format or an H.323 message. Next at step 310, the virtual gateway 112 selects a port and makes it busy on the H.323 gateway 114. Then at time 312, the make busy request is acknowledged by the H.323 gateway 114 to the virtual gateway 112. If no acknowledgment is received within a predetermined period, the virtual gateway 112 can select another port and try again to make that port busy. The messages that allow the virtual gateway to make ports busy on the H.323 gateway 114 can be proprietary messages or H.323 messages.

Next at time 314, the virtual gateway 112 provides the port address to the H.323 gatekeeper 110. Next, at time 316 the H.323 gatekeeper 110 responds to the address query request with the actual port that is now reserved in a busy state.

Next at step 318, the port address is provided to the H.323 gateway 106. Unlike in the delayed actual port binding, the two H.323 gateways will now talk directly with each other. The H.323 gateway 106 makes a call setup request at time 320.

Next, at time 322, the H.323 gateway 114 acknowledges the setup request. Because the port was reserved at time 310, the port will be available for the call. The channel setup and capability negotiation process 220 then occurs.

This process will result in two logical channels for voice communications: LCAB 222 and LCBA 224. The channel LCAB 222 is the logical channel for communications from the telephone 112 to the telephone 128. The channel LCBA 224 is the logical channel for communications from the telephone 128 to the telephone 112.

At time 325, the telephone 128 will ring. Once lifted off the hook, the two participants, computers, modems, etc., can communicate over the voice channels.

When one or both of the participants places their telephone back on the hook, at time 326–328, the channel and call teardown process 230 begins. When the process is complete, the port on the H.323 gateway is released and can be used for new incoming or outgoing calls.

D. Alternative Embodiments

In some embodiments, the virtual gateway 112 acts like a router for H.323 port access. In this fashion, the messages and data continue to come through the virtual gateway 112. The virtual gateway 112 then routes the messages and data to the appropriate gateway port. In this embodiment, the originating gateway will use the virtual port address for the entire session.

Although in the example given, a central office to central office setup was described, other applications are possible. For example, some embodiments of the invention can be used in corporate telephone networks. It is also possible for the H.323 gateways to be located away from the PSTN switches. For example, a long distance carrier could use standard circuit switched communications lines in a central office, but use H.323 gateways at regional centers. This would allow a long distance carrier to reduce the number of dedicated channels needed in its network because the long hauls would be in packetized form.

In some embodiments, the virtual gateways can be hardware based, software based, or a combination of the two. In some embodiments, the virtual gateway is incorporated with the H.323 gatekeeper so that a single device has the necessary hardware and software to support both the required H.323 gatekeeper functions and the added virtual gateway functions. In some embodiments, the virtual gateway is incorporated with one or more H.323 gateways to provide management of the H.323 ports of those gateways.

In some embodiments, the virtual gateway programs, delayed actual port binding programs, early actual port binding programs, and H.323 port management programs are included in one or more computer usable media such as CD-ROMs, floppy disks, or other media.

Some embodiments of the invention are included in an electromagnetic wave form. The electromagnetic wave form comprises information such as virtual gateway programs, delayed actual port binding programs, early actual port binding programs, and/or H.323 port management programs.

E. Conclusion

Therefore, a method and apparatus for a virtual gateway in an H.323 system has been described. Included are methods to improve the scalability of H.323 systems to support the large number of ports necessary in central office installations. Included are methods to allow an H.323 port to be made busy to prevent the problem where a port becomes busy before a call setup request is issued.

What is claimed is:

1. A method of responding to an address query request, the method comprising:
   receiving the address query request at an H.323 gatekeeper;
   responding to the address query request with a virtual port address using the H.323 gatekeeper;
   receiving a call setup request at the virtual port address on a virtual gateway;
   selecting a busy H.323 port on an H.323 gateway using the virtual gateway, the busy H.323 port having a corresponding port address; and
   acknowledging the call setup request with the port address using the virtual gateway.

2. The method of claim 1, wherein the virtual port address corresponds to a first port address capable of responding to a call setup request.

3. The method of claim 1, wherein the selecting the busy H.323 port on the H.323 gateway using the virtual gateway comprises making a H.323 port busy using the virtual gateway, the H.323 port being the busy H.323 port.

4. The method of claim 1, wherein the virtual gateway includes a port status data, the port status data comprising information about availability of respective H.323 ports on the H.323 gateway, and wherein the virtual gateway periodically polls ports managed by the virtual gateway to update the port status data, and wherein the selecting the busy H.323 port on the H.323 gateway using the virtual gateway comprises:
   using the port status data to select a H.323 port that is available;
   making the H.323 port busy, the H.323 port being the busy H.323 port.

5. The method of claim 1, wherein the selecting a busy H.323 port on an H.323 gateway using the virtual gateway is responsive to the call setup request.

6. The method of claim 1, wherein the acknowledging the call setup request with the port address using the virtual gateway comprises sending a message specifying logical channel (LC0) will use the port address.

7. The method of claim 1, wherein the acknowledging the call setup request with the port address using the virtual gateway comprises sending a message substituting the port address for the virtual port address.

8. The method of claim 1, wherein the virtual gateway includes a port activity data, the port activity data comprising information regarding time since previous activity occurred on respective H.323 ports on the H.323 gateway, and wherein the virtual gateway deactivates the busy H.323 port on the H.323 gateway if the busy H.323 port remains inactive for a predetermined period.

9. A method of responding to an address query request, the method comprising:
   receiving the address query request on a computer;
   selecting a busy H.323 port on an H.323 gateway using a virtual gateway, the busy H.323 port having a corresponding port address;
   responding to the address query request with the port address using the computer;
   receiving a call setup request at the port address on the H.323 gateway;
   acknowledging the call setup request with the port address using the H.323 gateway.

10. The method of claim 9, wherein the selecting the busy H.323 port on the H.323 gateway using the virtual gateway is before the responding to the address query request.

11. The method of claim 9, wherein the virtual gateway includes a port status data, the port status data comprising information about availability status of respective ports on the H.323 gateway, and wherein the virtual gateway periodically polls ports managed by the virtual gateway to update the port status data, and wherein the selecting the busy H.323 port on the H.323 gateway using the virtual gateway comprises:
   using the port status data to select a H.323 port that is available;
   making the H.323 port busy, the H.323 port being the busy H.323 port.

12. The method of claim 9, wherein the selecting a busy H.323 port on the H.323 gateway using the virtual gateway comprises making a H.323 port busy using the virtual gateway, the H.323 port being the busy H.323 port.

13. The method of claim 9, wherein the making the H.323 port busy using the virtual gateway further comprises:
   determining that the H.323 port is available using the virtual gateway;
   sending a message to the H.323 port to busy the port using the virtual gateway; and
   receiving an acknowledgement from the H.323 port at the virtual gateway.

14. The method of claim 9, wherein the virtual gateway includes a port activity data, the port activity data comprising information regarding time since previous activity occurred on respective ports on the H.323 gateway, and wherein the virtual gateway deactivates the busy H.323 port on the H.323 gateway if the busy H.323 port remains inactive for a predetermined period.

15. A method comprising:
   generating an address lookup request from a first H.323 port to a first H.323 gatekeeper;
   generating an address query request from the first H.323 gatekeeper to a second H.323 gatekeeper;
   generating an address query response from the second H.323 gatekeeper to the first H.323 port, the address query response including a virtual port;

generating a call setup request the first H.323 port to the virtual port;

generating a request from the virtual port to a second H.323 port, the request comprising a make busy request; and generating a call setup acknowledgement from the virtual port to the first H.323 port, the call setup acknowledgement including a port address corresponding to the second H.323 port.

16. A system comprising:

a plurality of H.323 ports;

a virtual gateway, the virtual gateway coupled in communication with the plurality of H.323 ports, the virtual gateway supporting at least a first virtual port, the virtual gateway capable of acknowledging a call setup request received on that at least a first virtual port with a first address corresponding to a port in the plurality of H.323 ports, the port being busy responsive to the virtual gateway; and an H.323 gatekeeper, the H.323 gatekeeper including configuration information specifying a first virtual gateway, the H.323 gatekeeper responding to an address query request with a second address corresponding to the at least a first virtual port.

* * * * *